Dec. 10, 1968    F. P. HELLER    3,415,951
DISPLAY APPARATUS UTILIZING PARTIALLY REFLECTING ADJUSTABLE
MIRROR TO SUPERIMPOSE TWO IMAGES
Filed March 15, 1965    4 Sheets-Sheet 1

INVENTOR:-
Fritz Peter Heller,
BY
Smith, Michael, Bradford & Gardiner,
ATTORNEYS.

Dec. 10, 1968  F. P. HELLER  3,415,951
DISPLAY APPARATUS UTILIZING PARTIALLY REFLECTING ADJUSTABLE
MIRROR TO SUPERIMPOSE TWO IMAGES
Filed March 15, 1965  4 Sheets-Sheet 2

INVENTOR
Fritz Peter Heller,
BY
Smith, Michael, Bradford & Gardiner,
ATTORNEYS.

United States Patent Office 3,415,951
Patented Dec. 10, 1968

3,415,951
DISPLAY APPARATUS UTILIZING PARTIALLY REFLECTING ADJUSTABLE MIRROR TO SUPERIMPOSE TWO IMAGES
Fritz P. Heller, London, England, assignor to Elliott Brothers (London) Limited, London, England, a British company
Filed Mar. 15, 1965, Ser. No. 439,827
Claims priority, application Great Britain, Mar. 20, 1964, 11,862/64
14 Claims. (Cl. 178—7.88)

ABSTRACT OF THE DISCLOSURE

In head-up display apparatus a distant scene is viewed through a partial reflector which also acts to superimpose data displayed on a cathode ray tube screen so that both the distant scene and the data can be viewed simultaneously by an observer. If it is desired to shift the reflector laterally so that the data is displayed on another portion of the scene provision is made in the form of a linkage or other control means for simultaneously angularly moving the partial reflector so that substantially the same portion of the data display is viewed by the observer.

---

This invention relates to display apparatus in which an optical system is used to present to an observer an image at infinity of symbolic information displayed on a cathode ray tube, so that this information may be assimilated by the observer without re-focusing or moving his eyes from part of another scene viewed simulaneously through the same optical system.

Arrangements of this kind are used to display to the operator of a vehicle information assisting him in his control of the vehicle. One such optical system comprises a partial reflector, a cathode ray tube so placed that a display produced on its screen is visible to the operator of a vehicle in the reflector as he views a scene external to the vehicle, and one or more lenses disposed between the cathode ray tube and the reflector, forming an optical system having a focal length such that the screen of the cathode ray tube appears to the operator as being at infinity. The characteristics of such arrangements are necessarily such that the image of the screen of the cathode ray tube can be viewed only within a narrow range of positions defined by a cone having an apical angle of usually less than 20°.

The present applicants have previously proposed a display apparatus in which a display produced on the screen of a cathode ray tube is made visible to an operator by reflection in a movable reflector. Movement of the reflector actuates means for varying the position and/or attitude of the display on the screen so that the image remains stationary in space as the reflector is moved.

According to the present invention there is provided display apparatus for superimposing, on a scene viewed by an observer, an image of a display, said apparatus comprising a partial reflector disposed on the path of light from a portion of the scene to the observer and inclined to this path to reflect light from the display to the observer and means for moving the reflector and varying the angle of incidence of light impinging on the reflector from the display to superimpose the image of the display on another portion of the scene.

Further according to the present invention there is provided display apparatus for superimposing, on a scene viewed by an observer, an image of a display on a cathode ray tube screen, said apparatus comprising a partial reflector disposed on the path of light from the scene to the observer and inclined to this path to reflect light from the display to the observer, and means for moving the reflector along the path of light from the display to the reflector to superimpose the image of the display on a different part of the scene and for varying the inclination of the reflector relatively to the screen to prevent any substantial change in the portion of the display reflected by the reflector to the observer.

Still further according to the present invention there is provided display apparatus for superimposing, on a scene viewed by an observer, an image of a display on a cathode ray tube screen, said apparatus comprising a partial reflector disposed on the path of light from the scene to the observer and inclined to this path to reflect light from the display to the observer, means for moving the reflector along the path of light from the screen to the reflector to superimpose the image of the display on a different part of the scene and for varying the inclination of the reflector relative to the screen and means to move the display across the screen in a manner compensating for movement of the reflector so that the reflected image of the display appears, to the observer, to remain stationary in space.

Yet further according to the present invention there is provided display apparatus for superimposing, on a scene viewed by an observer, an image of a display on a cathode ray tube screen, said apparatus comprising a partial reflector disposed on the light path from the scene to the observer and inclined to this light path at such an angle as to reflect light from the screen to the observer, and means for moving the reflector along the path of light from the screen to superimpose the image of the display on a different portion of the scene and for varying the angle of incidence of light from the screen relative to the reflector to prevent any substantial change in the portion of the display reflected by the reflector to the observer.

The invention will now be further described with reference to the accompanying diagrammatic drawings, of which:

Figure 2:
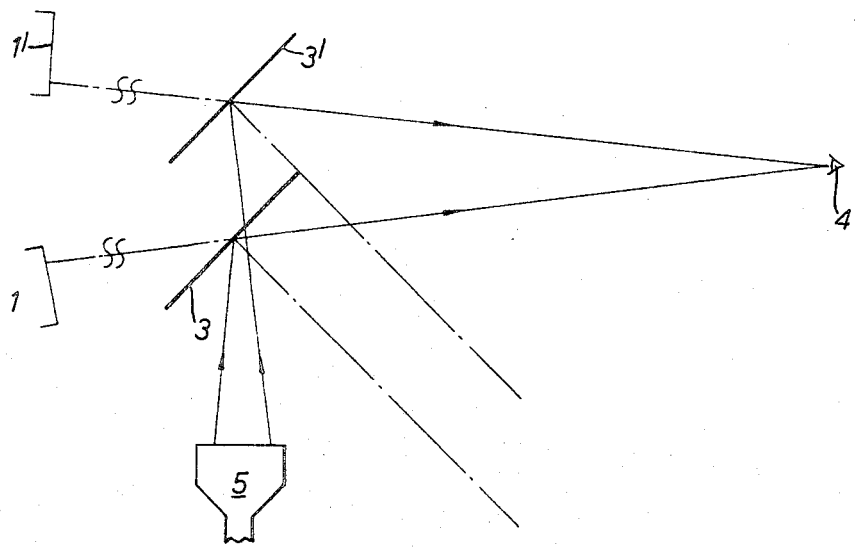
FIGURE 2 is a diagram showing the displacement of the field of view offered by the optical arrangement to an eye at a fixed position when a reflector is moved parallel to itself along the optical axis of the cathode ray tube.
Figure 3:
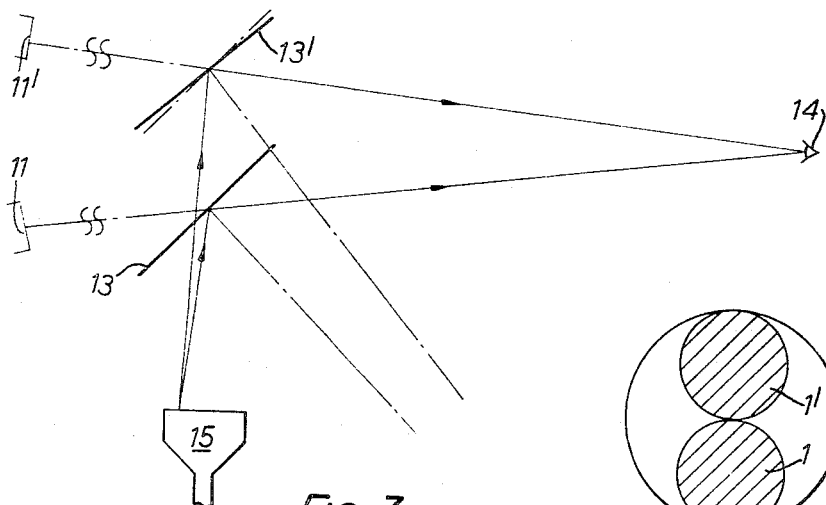
Figure 4:
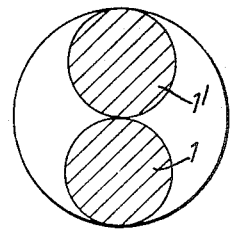
Figure 5:
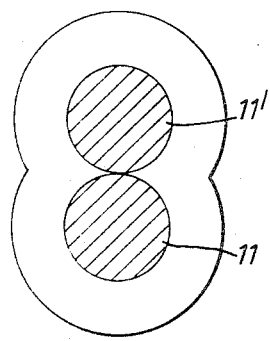
Figure 6:
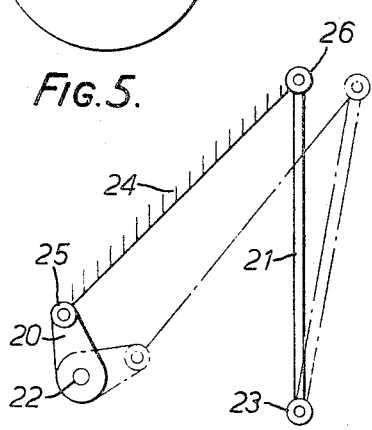
Figure 6A:
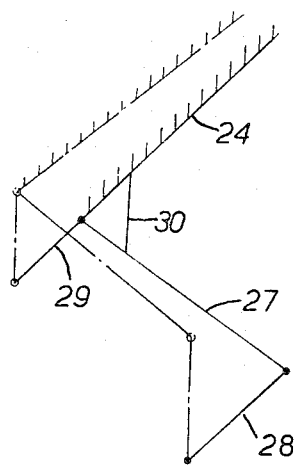
Figure 7:
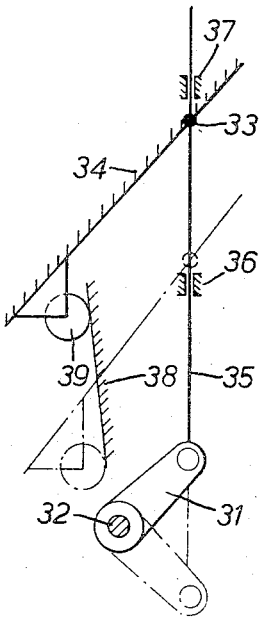
Figure 8:
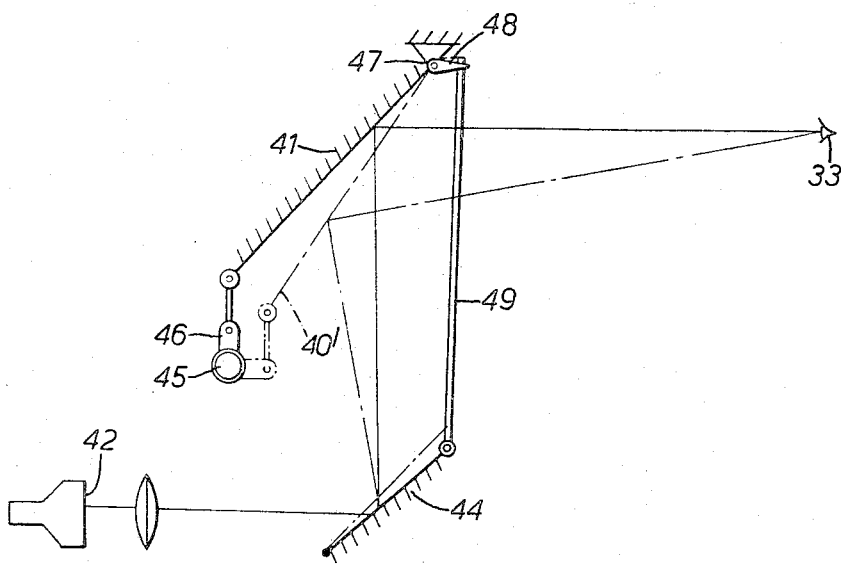
Figure 9:
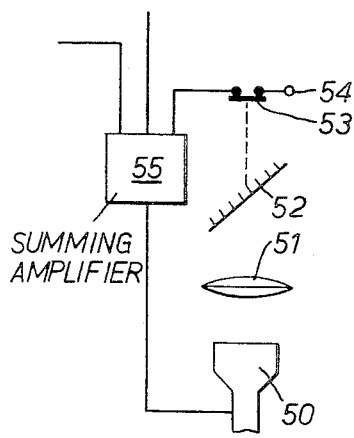
Figure 10:
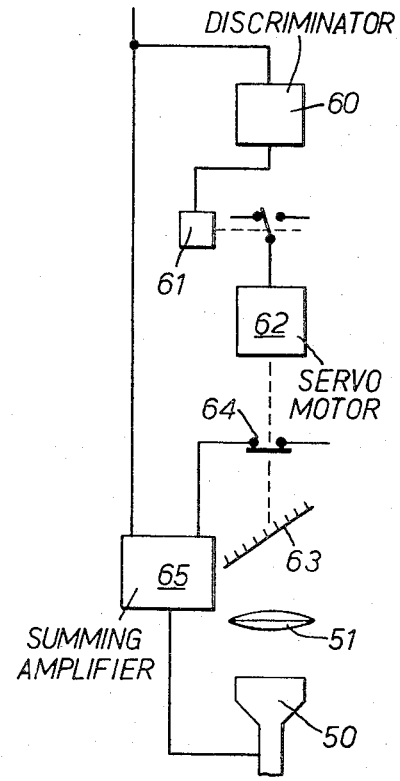
Figure 11:
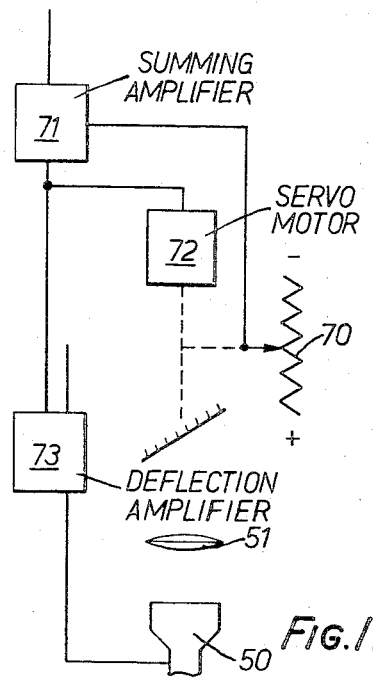
Figure 12:
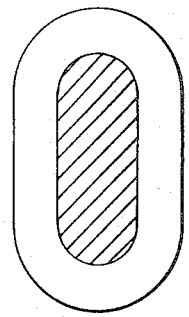

FIGURE 3 is a diagram showing the effect of axially displacing the reflector and turning it through a small angle, FIGURE 4 is a diagram showing the field of view and the available display area in the apparatus of FIGURE 2, FIGURE 5 shows the field of view and the available display area tube in the apparatus of FIGURE 3, FIGURE 6 is a representation of a linkage for producing the required displacement of the reflector, FIGURE 6A is a modified linkage which has the same purpose as the embodiment of FIGURE 6, FIGURE 7 shows an alternative linkage arrangement for producing the required displacement of the reflector, FIGURE 8 shows an arrangement of two reflectors which are rotated so as to achieve the same optical effect as in the arrangement shown in FIGURE 3, FIGURE 9 is a diagram of an arrangement for electronically correcting the shift of the display due to the reflector displacement, the reflector having two positions, FIGURE 10 is a diagram of an arrangement in which the reflector is displaced by a 2-position servo when the magnitude of a deflection signal applied to the cathode ray tube passes a certain limit, FIGURE 11 is a diagram of a continuous servo system for moving the reflector, whilst FIGURE 12 shows the resulting image field of view of the cathode ray tube.

Figure 1:
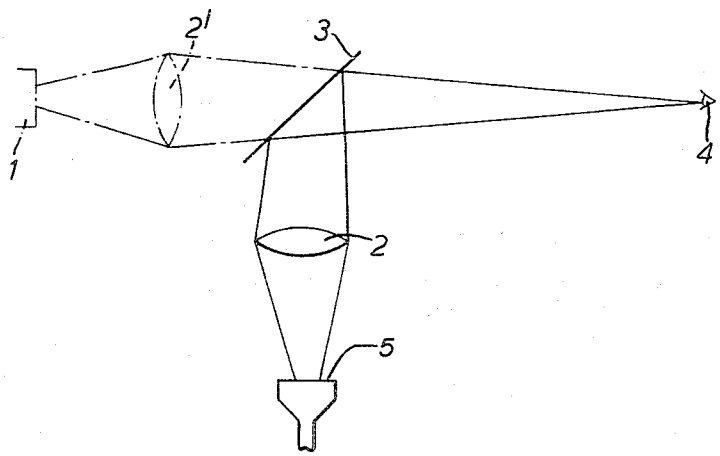
FIGURE 1 is a diagram showing a previously proposed optical arrangement used to present to an observer an image at infinity of symbolic information displayed on the screen of a cathode ray tube.

The previously proposed display arrangement shown in the diagram of FIGURE 1 comprises a screen 1 of a cathode ray tube 5, a collimator lens system represented as a single lens 2 and a partial reflector 3. The screen 1 of the cathode ray tube is in the focal plane of the lens system 2 so that the resultant image of the screen produced by the lens system 2 is at infinity. The partial reflector 3 reflects light from the lens system 2 to an observer 4, who therefore observes the image of the cathode ray tube screen at infinity superimposed on a real scene (not indicated) which is viewed directly through the partial reflector 3.

In this optical arrangement the angle within which the image is visible is the angle which the lens aperture subtends at the eye of the observer and in practice this may be only some 10°. The lens diameter forms an imaginary porthole in front of the observer limiting the display but not the background. Normally this limitation is acceptable but there are applications when it is desirable to extend the angle through which the image may be observed as superimposed upon the background. Increasing the size of the collimator lens system would be expensive and unpractical. It is, however, possible to displace the reflector along the viewing axis and consequently displace the porthole in relation to the background.

If the reflector is moved so that in its subsequent position it is parallel to its first position, then the portion of the screen 1 of the cathode ray tube 5 visible to the observer is altered. This effect is illustrated in the single ray diagram of FIGURE 2. The reflector 3 provides in its initial position a reflected image of one part of the cathode ray tube screen 1, and in the second position the reflector shown at 3′ provides a reflected image 1′ of a different part of the cathode ray tube screen. This is not satisfactory since the available extension of display is limited by the boundary of the cathode ray tube.

In apparatus according to the present invention the reflector in its second position is rotated through a small angle in relation to its first position so that the portion of the cathode ray tube screen presented to the observer remains the same for both positions as shown in FIGURE 3. The observer's position is shown at 14 in FIGURE 3, and the initial position of the reflector is shown at 13 providing an image of the cathode ray tube screen 11. In the second position of the reflector 13′ it is shown as having been rotated through a small angle of about 5° so as to provide an image at 11′ of the cathode ray tube screen. In this embodiment the portion of the cathode ray tube screen imaged in both positions of the reflector remains the same.

FIGURES 4 and 5 show respectively the fields of view obtained with the reflector displacements shown in FIGURES 2 and 3. The shaded area indicates the field of view at a fixed eye position. The surrounding unshaded area indicates the additional field of view obtainable by moving the head.

The axial displacement and rotation of the reflector 13 may be effected by any suitable mechanical arrangement of which those shown diagrammatically in FIGURES 6 and 7 are described by way of example only.

In FIGURE 6 two links 20 and 21 of unequal length each pivoted at one end 22 and 23 respectively carry a reflector 24 pivotally secured to each link at 25 and 26. Movement of the link 20 about the pivot 22 moves the reflector to the position shown in broken lines. In a modification of the embodiment of FIGURE 6 which is illustrated in FIGURE 6A, the reflector 24 is secured to one link 27 of a trapezoidal linkage system both directly and through a strut 30. The linkage system also includes links 28, 29 of unequal length pivoted at one end to the opposite ends of the link 27 and at the opposite end to fixed pivots. It will be seen that angular movement of the links 28, 29 about the fixed pivots produces both translatory and angular movement of the reflector 24.

An alternative mechanical arrangement for achieving the required displacement is shown in FIGURE 7. Axial movement is produced by rotating a link 31 about a shaft 32, the link being coupled by a pivot pin 33 to a reflector 34 by a rod 35 slidable in guides 36 and 37. Angular movement of the reflector 34 is produced by a surface 38 inclined to the rod 35, along which a wheel 39 runs when the reflector is axially displaced, such displacement causing the reflector to turn about the pivot pin 33. When the shaft 32 is turned in a clockwise sense the link 31 draws the rod 35 downwardly so that the reflector 34 is moved to the position shown in broken lines, the wheel 39 running along the inclined surface 38, causing the reflector in this latter position to be at an angle to the reflector position shown in full lines.

A displacement of the reflector can be soomewhat inconvenient mechanically due to the mass of the reflector and the need for rapid transition from one position to the other. Accordingly, in a preferred embodiment of the invention a display arrangement is provided having two angularly displaceable reflectors. This arrangement is shown diagrammatically in FIGURE 8, in which a semi-reflective main reflector 41 reflects an image of the screen of a cathode ray tube 42 to an observer at 43 by way of an auxiliary reflector 44. A shaft 45 carries an articulated linkage 46 connected to the main reflector 41. The main reflector is pivoted at 47 and is provided with an extension 48 connected to a link 49 in turn coupled to the auxiliary reflector 44. Rotation of the shaft 45 in a clockwise sense thus causes the main reflector to assume the position indicated by broken lines at 40′ and displaces the auxiliary reflector 44 by way of the link 49 towards the position shown in broken lines. The displacements of the two reflectors are arranged to be such that the imaged portion of the screen of the cathode ray tube remains the same although the angle through which the image can be observed superimposed upon the external scene is varied by displacement of the reflectors.

An arrangement as hereinbefore described in which the main reflector is rotated through a small angle ensures that the field of view of the screen of the cathode ray tube presented to the observer remains the same provided that the position of the observer remains unchanged.

Although the portion of the cathode ray tube viewed as an image by the observer can be caused to remain constant by adjustment of the reflector as hereinbefore described, the position of the image with respect to the outside scene is shifted by such adjustment. In most cases the position of the image display with respect to the outside scene constitutes an important part of the data required to be presented to an observer by such a display. In general the image shift produced by the reflector adjustment will have to be compensated. In FIGURE 9 there is shown a diagram of a simple circuit for applying a correction signal to the cathode ray tube so that the display is moved to maintain the position of the displayed image in space constant. A cathode ray tube is shown at 50, from the screen of which light passes through a collimator lens system 51 to a reflector 52. Movement of the reflector 52 operates a switch 53 to which the reflector is mechanically connected. The switch 53 connects a terminal 54 to a summing amplifier 55, which controls the image position displayed in elevation by the cathode ray tube. The input applied by way of the terminal 54 on closure of the switch 53 is calibrated so as to cancel out exactly the image shift produced by the reflector.

It may be desirable to change the reflector position automatically when the elevation signal moves the display out of view. FIGURE 10 shows diagrammatically an arrangement for effecting such a change, the signal controlling the position in elevation of the image displayed by the cathode ray tube is applied to a discriminator 60 which produces an output when the elevation signal exceeds a certain limit. This output is applied to a relay 61 to energise a motor 62 to drive the reflector 63 into its alternative position. In the quiescent state, the relay energises the motor to drive the reflector 63 to its normal position. When the reflector 63 is caused to assume its alternative position, a switch 64 is closed to supply an input signal to a summing amplifier 65 also fed with the elevation signal, to produce an output which compensates for the shift of the image in space produced by the reflector movement as hereinbefore described. Refinements to this basic arrangement will of course be incorporated in a practical embodiment and would include mechanical stabilisation for the reflector in its two end positions and also means for D.C. energisation of the motor when the reflector is at rest.

The field of view for this display is still further extended in accordance with the present invention by using a continuous servo drive to move the reflector instead of the two position arrangement hereinbefore described. A servo drive is arranged to operate a feed-back potentiometer the output voltage of which is precisely proportional to the elevation produced by the reflector. FIGURE 11 is a schematic diagram of such an arrangement in which the output from a feed-back potentiometer 70 is added at 71 to the elevation signal. The sum is used on the one hand to operate the servo motor 72 and on the other hand as the elevation signal applied to a deflection amplifier 73. The servo drive thus tends to null the elevation signal and the display remains central on the cathode ray tube. Within the range of the servo all elevational changes are therefore produced by mechanical means.

When the servo reaches its mechanical limit it fails to null a further increase of the elevation signal and therefore electronic deflection takes over. Electronic deflection also serves to make up for transient servo errors owing to the time lags or friction or even limited instability. The deflection accuracy of this system only depends on the calibration of the feed-back potentiometer in relation to reflector movement. By trimming this potentiometer on an optical test bench very high accuracy can be achieved without recourse to high precision gearing or other components.

Since the display remains centered on the cathode ray tube no head movement is necessary within the range of the servo system. The central position also tends to minimise optical errors and electron-optical errors.

FIGURE 12 is a diagram of the field of view obtained with the aid of the servo drive described with reference to FIGURE 11. It will be seen that the servo drive gives no central blind spot whatever the servo range, with a consequent gain in field of view.

I claim:

1. Display apparatus for superimposing, on a scene viewed by an observer, an image of a display, said apparatus comprising
    a partial reflector disposed in the path of light from a portion of the scene to the observer and inclined to this path to reflect light from the display to the observer, and
    means for moving the reflector along the light path from the display to superimpose the display on a different part of the scene and for varying the angle of incidence of light impinging on the reflector from the display substantially to prevent any change in the portion of the display reflected by the partial reflector to the observer.

2. Display apparatus according to claim 1, wherein said display is produced on a cathode ray tube screen.

3. Display apparatus according to claim 1, further comprising
    means to move the display across the screen in a manner compensating for movement of the reflector so that the reflected image of the display appears, to the observer, to remain stationery in space.

4. Apparatus according to claim 3, wherein the means for moving the display across the screen comprises
    a switch operable mechanically in response to movement of the partial reflector and
    an electronic circuit comprising the said switch,
    which circuit serves to control the display position on the cathode ray tube screen.

5. Apparatus according to claim 3, comprising
    means for automatically adjusting the reflector to maintain the display in view when a deflection signal to the cathode ray tube tends to move the display out of view.

6. Apparatus according to claim 5, wherein the adjusting means comprises
    a discriminator circuit arranged to produce an output signal when the deflection signal exceeds a predetermined limit,
    a relay connected to receive the output signal of the discriminator circuit,
    a motor energized by the relay to drive the partial reflector to a required position,
    a switch mechanically operable in response to movement of the partial reflector, and
    a summing amplifier in circuit with the switch, which is also connected to receive the deflection signal,
    the summing amplifier being operative, an actuation of the switch, to produce an output which compensates for the change in the portion of the display visible to the observer which is produced by movement of the reflector.

7. Apparatus according to claim 5, wherein the adjusting means includes
    a continuously operable servo-drive for moving the reflector,
    a feed-back potentiometer operable by the servo-drive,
    a servo-motor for varying the inclination of the reflector and
    a deflection signal amplifier for the cathode ray tube,
    both the servo-motor and the amplifier being connected to receive the output voltage of the potentiometer which is proportional to the deflection signal on the cathode ray tube and the arrangement being such that the display is continuously maintained in a central position on the screen of the cathode ray tube.

8. Apparatus according to claim 1, wherein the means for moving and for varying the angle of inclination of the reflector comprises
    a linkage mechanism operable to effect the movement and the variation in the inclination of the reflector substantially simultaneously.

9. Apparatus according to claim 8, wherein the linkage mechanism includes
    a relatively long link pivoted at one point on the reflector and
    a relatively short link pivoted at another point on the reflector,
    said links also being pivoted about two spaced fixed points.

10. Apparatus according to claim 8, wherein the linkage mechanism includes
    a rod pivoted on the reflector and slidable longitudinally in a guide, and
    roller means carried by the reflector and in engagement with a fixed surface inclined relatively to the reflector and to the rod.

11. Apparatus according to claim 1, wherein the means for moving the partial reflector and for varying the angle of incidence of light impinging on the partial reflector comprises
    an auxiliary reflector interposed in the light path from the display to the partial reflector and
    a linkage interconnecting the reflectors to effect pivotal movement of both reflectors.

12. Display apparatus in which a display formed on the screen of a cathode ray tube is rendered visible to an observer by means of an optical system including
- at least one reflector arranged for simultaneous displacement both by translation along the optical path by which light becomes incident upon said reflector and by tilting about an axis perpendicular to said path and parallel to the plane of said reflector in such a manner that the portion of the screen of said cathode ray tube visible to said observer without eye movement remains unaltered,
- actuating means for modifying the deflection of the electron beam of said cathode ray tube operable by displacement of said reflector so that the apparent position in space of said image remains constant despite said displacement.

13. Display apparatus for superimposing, on a scene viewed by an observer, an image of a display on a cathode ray tube screen, said apparatus comprising
- a partial reflector disposed on the path of light from the scene to the observer and inclined to this path to reflect light from the display to the observer,
- means for moving the reflector along the path of light from the screen to the reflector to superimpose the image of the display on a different part of the scene and for varying the inclination of the reflector relative to the screen,
- means to move the display across the screen in a manner compensating for movement of the reflector so that the reflected image of the display appears, to the observer, to remain stationary in space, and
- means for automatically adjusting the reflector to maintain the display in view when a deflection signal to the cathode ray tube tends to move the display out of view, said adjusting means comprising,
- a discriminator circuit arranged to produce an output signal when the deflection signal exceeds a predetermined limit,
- a relay connected to receive the output signal of the discriminator circuit,
- a motor energized by the relay to drive the partial reflector to a required position,
- a switch mechanically operable in response to movement of the partial reflector, and
- a summing amplifier in circuit with the switch, which is also connected to receive the deflection signal, the summing amplifier being operative, on actuation of the switch, to produce an output which compensates for the change in the portion of the display visible to the observer which is produced by movement of the reflector.

14. Display apparatus for superimposing, on a scene viewed by an observer, an image of a display on a cathode ray tube screen, said apparatus comprising
- a partial reflector disposed on the path of light from the scene to the observer and inclined to this path to reflect light from the display to the observer,
- means for moving the reflector along the path of light from the screen to the reflector to superimpose the image of the display on a different part of the scene and for varying the inclination of the reflector relative to the screen,
- means to move the display across the screen in a manner compensating for movement of the reflector so that the reflected image of the display appears, to the observer, to remain stationary in space, and
- means for automatically adjusting the reflector to maintain the display in view when a deflection signal to the cathode ray tube tends to move the display out of view, said adjusting means comprising,
- a continuously operable servo-drive for moving the reflector,
- a feed-back potentiometer operable by the servo-drive,
- a servo-motor for varying the inclination of the reflector and
- a deflection signal amplifier for the cathode ray tube,
- both the servo-motor and the amplifier being connected to receive the output voltage of the potentiometer which is proportional to the deflection signal on the cathode ray tube and the arrangement being such that the display is continuously maintained in a central position on the screen of the cathode ray tube.

References Cited

UNITED STATES PATENTS 3,274,545  9/1966  Bowles et al. _____ 340—24

ROBERT L. GRIFFIN, *Primary Examiner.*

R. L. RICHARDSON, *Assistant Examiner.*

U.S. Cl. X.R.

178—7.85, 7.89; 340—24; 352—285